United States Patent
Kim et al.

(10) Patent No.: US 8,164,564 B2
(45) Date of Patent: Apr. 24, 2012

(54) LIQUID CRYSTAL DISPLAY AND METHOD OF CONTROLLING THE SAME

(75) Inventors: Su-gun Kim, Hwaseong-si (KR); Tae-hee Cho, Seoul (KR); Ki-bum Seong, Anyang-si (KR); Il-yong Jung, Suwon-si (KR); Kye-hoon Lee, Suwon-si (KR); Jun-young Lee, Yongin-si (KR); Jung-hyeon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 895 days.

(21) Appl. No.: 11/514,242

(22) Filed: Sep. 1, 2006

(65) Prior Publication Data

US 2007/0052662 A1 Mar. 8, 2007

(30) Foreign Application Priority Data

Sep. 5, 2005 (KR) .................. 10-2005-0082194

(51) Int. Cl.
  *G09G 3/36* (2006.01)
(52) U.S. Cl. .......... 345/102; 345/103; 345/204; 345/82; 349/61; 349/62; 349/63; 349/69; 362/27; 362/237; 362/241; 362/244; 362/97.2
(58) Field of Classification Search .................. 345/102, 345/103, 212, 82, 84, 87, 204; 349/61–64, 349/69–70; 362/27, 237, 241, 244, 97.1–97.3
See application file for complete search history.

(56) References Cited

U.S. PATENT DOCUMENTS

| | | | |
|---|---|---|---|
| 6,219,113 B1 * | 4/2001 | Takahara | 349/42 |
| 6,608,614 B1 | 8/2003 | Johnson | |
| 6,857,767 B2 * | 2/2005 | Matsui et al. | 362/373 |
| 6,891,525 B2 * | 5/2005 | Ogoro | 345/102 |
| 7,530,711 B2 * | 5/2009 | Bang | 362/241 |
| 7,777,166 B2 * | 8/2010 | Roberts | 250/205 |
| 7,789,531 B2 * | 9/2010 | Duong et al. | 362/257 |
| 7,839,466 B2 * | 11/2010 | Shih et al. | 349/64 |
| 2004/0008177 A1 * | 1/2004 | Ahn | 345/102 |
| 2004/0218390 A1 * | 11/2004 | Holman et al. | 362/245 |
| 2004/0257329 A1 * | 12/2004 | Park et al. | 345/102 |
| 2005/0083689 A1 * | 4/2005 | Park | 362/237 |
| 2005/0104827 A1 * | 5/2005 | Baik | 345/87 |
| 2005/0140641 A1 * | 6/2005 | Kim et al. | 345/102 |
| 2005/0168967 A1 * | 8/2005 | Kao et al. | 362/27 |

(Continued)

FOREIGN PATENT DOCUMENTS

CN 1471074 A 1/2004

(Continued)

*Primary Examiner* — Lun-Yi Lao
*Assistant Examiner* — Priyank Shah
(74) *Attorney, Agent, or Firm* — Roylance, Abrams, Berdo & Goodman, LLP (57) ABSTRACT

A liquid crystal display and control method thereof, having a liquid crystal display panel, a light emitting diode device which is disposed on the rear of the liquid crystal display panel and which is divided into a plurality of partitioned areas that are capable of being driven independently, a light guide part disposed for each of the partitioned areas, an image calculating part for dividing the liquid crystal display panel into a plurality of regions and calculating the brightness of each region by using image data, and an inverter and an inverter controller to provide differentiated power to the partitioned areas based on the calculated brightness.

28 Claims, 12 Drawing Sheets

U.S. PATENT DOCUMENTS

| | | | |
|---|---|---|---|
| 2005/0184952 A1* | 8/2005 | Konno et al. | 345/102 |
| 2006/0221611 A1* | 10/2006 | Noh et al. | 362/247 |
| 2006/0256256 A1* | 11/2006 | Seong et al. | 349/73 |
| 2007/0052662 A1* | 3/2007 | Kim et al. | 345/102 |
| 2007/0052663 A1* | 3/2007 | Kim et al. | 345/102 |

FOREIGN PATENT DOCUMENTS

| | | |
|---|---|---|
| CN | 1558283 A | 12/2004 |
| CN | 1564058 A | 1/2005 |
| CN | 100526945 C | 8/2009 |
| JP | 2001-135118 | 5/2001 |
| JP | 2003-257220 | 9/2003 |
| JP | 2004-055327 | 2/2004 |
| KR | 10-2004-0021178 A | 3/2004 |
| KR | 10-2004-0074406 A | 8/2004 |
| KR | 1020040090083 A | 10/2004 |
| KR | 1020050002566 A | 1/2005 |
| KR | 10-2005-0036534 | 4/2005 |

\* cited by examiner

| | | | | PARTITION AREA, REGION |
|---|---|---|---|---|
| 1<br>10<br>R20 G50 B30 | 2<br>60<br>R10 G40 B50 | 3<br>55<br>R15 G50 B35 | 4<br>70<br>R70 G10 B20 | 5<br>20 — BRIGHTNESS<br>R80 G10 B10 — COLOR |
| 6<br>70<br>R15 G30 B55 | 7<br>100<br>R80 G20 B 0 | 8<br>35<br>R70 G10 B20 | 9<br>45<br>R50 G 0 B50 | 10<br>90<br>R 0 G10 B90 |
| 11<br>80<br>R30 G35 B35 | 12<br>90<br>R40 G45 B15 | 13<br>50<br>R40 G10 B50 | 14<br>40<br>R50 G40 B10 | 15<br>30<br>R10 G10 B80 |

LIQUID CRYSTAL DISPLAY AND METHOD OF CONTROLLING THE SAME

CROSS-REFERENCE TO RELATED APPLICATIONS

This application claims the benefit under 35 U.S.C. §119(a) of Korean Patent Application No. 10-2005-0082194, filed in the Korean Intellectual Property Office on Sep. 5, 2005, the entire disclosure of which is hereby incorporated by reference.

BACKGROUND OF THE INVENTION

1. Field of the Invention

The present invention relates to a liquid crystal display. More particularly, the present invention relates to a liquid crystal display in which brightness of a light emitting diode is changed according to regions of a screen.

2. Description of the Related Art

A liquid crystal display (LCD) comprises an LCD panel having a thin film transistor (TFT) substrate on which the TFTs are formed and a color filter substrate on which the color filters are formed, and a liquid crystal layer disposed therebetween. Since the LCD panel does not emit light by itself, the LCD may further comprise a backlight unit in the rear of the TFT substrate as a light source for providing light. The transmittance of the light generated from the backlight unit is adjusted according to an alignment of the liquid crystal in the liquid crystal layer.

The light source of the backlight unit may be a cold cathode fluorescent lamp (CCFL), an external electrode fluorescent lamp (EEFL), organic light emitting diode (OLED), and the like. Recently, a light emitting diode (LED) having a good color reproducibility and brightness has become popular.

In general, the LED provides light having a constant strength for the LCD panel, without relation to an image displayed on the screen. Hence, if a dark image is displayed on the screen, the light of the LED leaks. Thus, the contrast ratio is poor and consumption power is used wastefully.

Recently, a method has been developed in which the screen is divided into a plurality of regions and thus, the LED can have different brightness according to the region. If such a method is used, the bright screen is brighter and the dark screen is darker. Accordingly, the display quality can be improved. However, control of the brightness is difficult since the light of the LED influences other adjacent regions.

Accordingly, a need exists for a system and method in which brightness of a light emitting diode is changed according to the regions of a divided screen.

SUMMARY OF THE INVENTION

Accordingly, it is an object of embodiments of the present invention to substantially solve the above and other problems, and to provide a liquid crystal display in which brightness of a light emitting diode is changed according to the regions of a divided screen and the brightness of each region is controlled without difficulty.

Additional features of embodiments of the present invention will be set forth in the description which follows, and in part will be apparent from the description, or may be learned by practice of the present invention.

The foregoing and/or other aspects of embodiments of the present invention can be achieved by providing a liquid crystal display, comprising a liquid crystal display panel, a light emitting diode device which is disposed on the rear of the liquid crystal display panel and which is divided into a plurality of partitioned areas capable of being driven independently, a light guide part disposed for each of the partitioned areas and thus guiding light generated from the light emitting diode device in a direction of the liquid crystal display panel, an image calculating part for dividing the liquid crystal display panel into a plurality of regions and calculating the brightness of each region by using image data, an inverter for providing power for the light emitting diode device as divided by the partitioned areas, and an inverter controller for controlling the inverter to provide respective power to the partitioned areas based on the calculated brightness provided by the image calculating part.

According to an aspect of embodiments of the present invention, the light emitting diode device is disposed on substantially the entire rear surface of the liquid crystal display panel.

According to another aspect of embodiments of the present invention, the light guide part comprises a transparent pillar disposed between the light emitting diode device and the liquid crystal display panel.

According to another aspect of embodiments of the present invention, the transparent pillar substantially encloses the light emitting diode device.

According to another aspect of embodiments of the present invention, a section of the transparent pillar facing the liquid crystal display panel is a rectangular shape.

According to another aspect of embodiments of the present invention, a section of the transparent pillar facing the liquid crystal display panel is a regular hexagonal shape.

According to another aspect of embodiments of the present invention, a section of the transparent pillar is increasingly wider toward the liquid crystal display panel.

According to another aspect of embodiments of the present invention, the light guide part comprises a partition dividing the partitioned areas.

According to another aspect of embodiments of the present invention, the partition is higher than the light emitting diode device.

According to another aspect of embodiments of the present invention, the partition is formed using a white color film.

According to another aspect of embodiments of the present invention, the partition comprises polyethylene terephthalate (PET) or polycarbonate (PC) materials.

According to another aspect of embodiments of the present invention, the light guide part comprises a plurality of sub light guide plates disposed on the rear of the liquid crystal display panel, and the light emitting diode device is provided on a light incident plane of each sub light guide plate.

According to another aspect of embodiments of the present invention, the sub light guide plates are disposed on the same plane.

According to another aspect of embodiments of the present invention, the sub light guide plate is a wedge shape.

According to another aspect of embodiments of the present invention, a light exiting plane of the sub light guide plate is substantially parallel to the liquid crystal display panel.

According to another aspect of embodiments of the present invention, the liquid crystal display further comprises a main light guide plate disposed between the plurality of sub light guide plates and the liquid crystal display panel, and a light source provided on a light incident plane of the main light guide plate.

According to another aspect of embodiments of the present invention, the image calculating part further calculates a color value of each region, and the inverter controller controls the inverter to provide power for the light emitting diode device based on the calculated color value provided by the image calculating part.

According to another aspect of embodiments of the present invention, the partitioned area for the light emitting diode device and the region correspond to each other.

It is to be understood that both the foregoing general description and the following detailed description are exemplary and explanatory, and are intended to provide further explanation of the invention as claimed.

BRIEF DESCRIPTION OF THE DRAWINGS

The above and/or other aspects and advantages of embodiments of the prevent invention will become apparent and more readily appreciated from the following description of the exemplary embodiments, taken in conjunction with the accompany drawings, in which.

Throughout the drawings, like reference numerals will be understood to refer to like parts, components and structures.

DETAILED DESCRIPTION OF EXEMPLARY EMBODIMENTS

Reference will now be made in detail to embodiments of the present invention, examples of which are illustrated in the accompanying drawings, wherein like reference numerals refer to like elements throughout. The embodiments are described below so as to explain embodiments of the present invention by referring to the figures.

An exemplary LCD according to a first embodiment of the present invention will be described with reference to the FIGS. 1 through 3.

Figure 1:
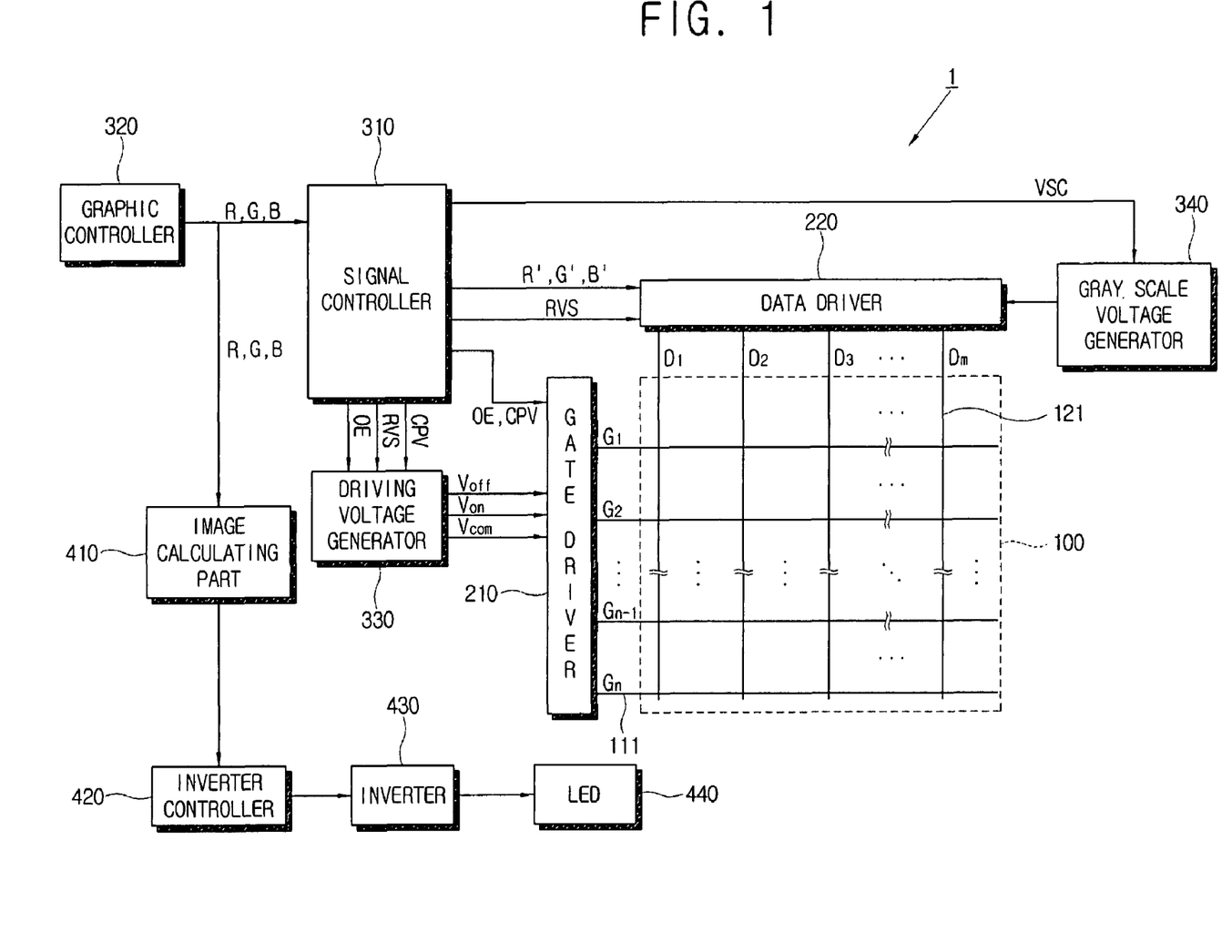
FIG. 1 is a block diagram of an exemplary LCD according to a first embodiment of the present invention.
Figure 2:
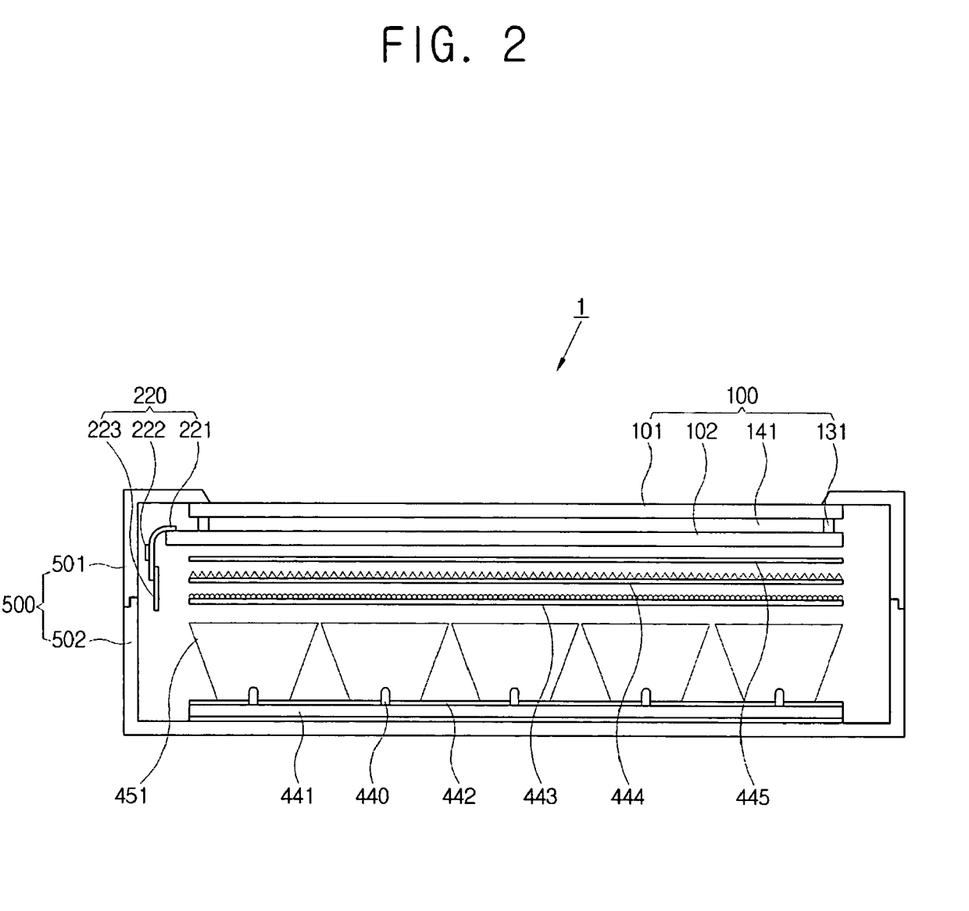
FIG. 2 is a sectional view of the LCD according to the first embodiment of the present invention.
Figure 3:
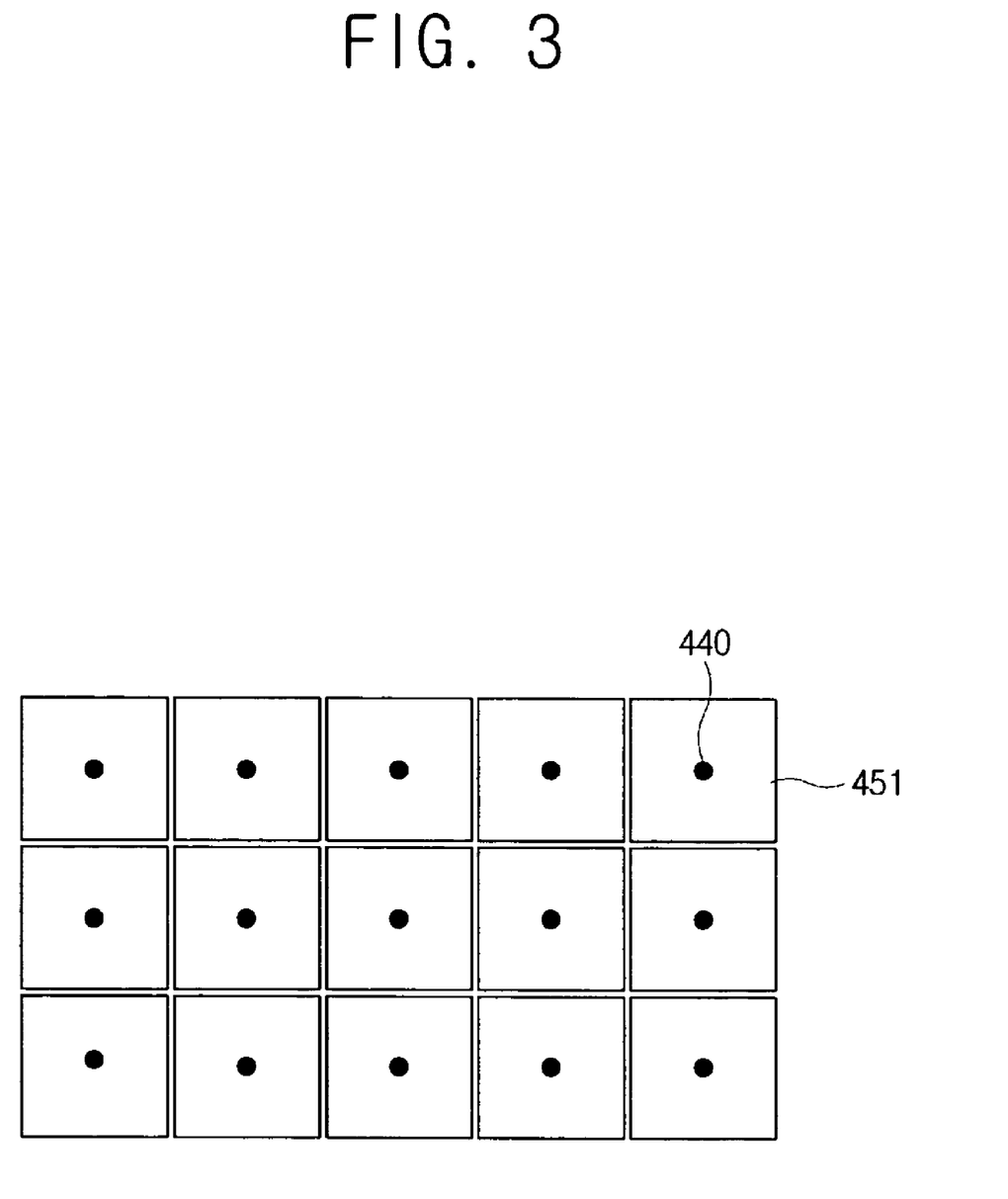
FIG. 3 is a view for illustrating an exemplary arrangement relation of an LED and a light guide part according to the first embodiment of the present invention.

FIG. 1 is a block diagram of an LCD according to the first embodiment of the present invention, and FIG. 2 is a sectional view of the LCD according to the first embodiment of the present invention. FIG. 3 is a view for illustrating an arrangement of an LED and a light guide part according to the first embodiment of the present invention.

An LCD 1 of embodiments of the present invention comprises an LCD panel 100, a gate driver 210 and a data driver 220 connected to the LCD panel 100, a driving voltage generator 330 connected to the gate driver 210 and a gray scale voltage generator 340 connected to the data driver 220, and a signal controller 310 which controls the above components and receives image data from a graphic controller 320. The image data from the graphic controller 320 is also provided to an image calculating part 410. The image calculating part 410 provides the brightness of an individual region to an inverter controller 420 controlling an inverter 430. The inverter 430 supplies power for an LED 440.

The LCD panel 100 comprises a color filter substrate 101 on which color filters are formed and a TFT substrate 102 on which TFTs are formed. A liquid crystal layer 141 is arranged in a space, e.g., a cell gap, formed by the two substrates 101 and 102 and a sealant 131 is arranged along the edges of the two substrates 101 and 102.

The driving voltage generator 330 generates a gate on voltage Von for turning on the TFTs, a gate off voltage Voff for turning off the TFTs, a common electrode voltage Vcom applied to a common electrode, and the like, and provides them to the gate driver 210.

The gray scale voltage generator 340 generates a plurality of gray scale voltages related to the brightness of the LCD 1 and then provides them to the data driver 220.

The gate driver 210, which is also referred to as a scan driver, is connected to a gate line 111 and applies a gate signal comprising a combination of the gate on voltage Von and the gate off voltage Voff from the driving voltage generator 330 to the gate line 111.

A gray scale voltage from the gray scale voltage generator 340 is applied to the data driver 220, which is also referred to as a source driver. The data driver 220 selects the gray scale voltage for the data line 121 according to the control of the signal controller 310, and applies the gray scale voltage as a data signal to the data line 121. The data driver 220 comprises a flexible printed circuit (FPC) 221 of which a first side is connected to the TFT substrate 102, a driving chip 222 mounted on the FPC 221, and a printed circuit board (PCB) 223 connected on a second side of the FPC 221. Here, the data driver 220 shown in FIG. 2 is a chip on film (COF) type. However, other types of data drivers can be used, such as tape carrier package (TCP) or chip on glass (COG) type. The gate driver 210 can be provided in substantially the same manner as the data driver 220, and can be formed on the TFT substrate 121.

The signal controller 310 generates a control signal for controlling operations of the gate driver 210, the data driver 220, the driving voltage generator 330, the gray scale voltage generator 340, and the like, and thus provides a control signal for each of the gate driver 210, the data driver 220 and the driving voltage generator 330.

The image calculating part 410 receives the image data from the graphic controller 320 and divides the LCD panel 100, e.g., the screen, into a plurality of regions and calculates the brightness of each region. The inverter controller 420 controls the inverter 430 such that power is supplied to the LED 440 based on the calculated value provided by the image calculating part 410.

The LEDs 440, mounted on the LED circuit board 441, are disposed on substantially the entire rear surface of the LCD panel 100. The LEDs 440 are provided as three lines in width and five lines in length and thus, a sum of the LEDs 440 is fifteen. This is presented as one example only, and other embodiments of the present invention can comprise any number of LEDs as required. Each of the LEDs 440 shown in FIG. 3 provides white light. For this purpose, each LED 440 can comprise an RGB multi unit, but are not limited thereto.

The reflecting plate 442 reflects the light generated from the LEDs 440 and directs the reflected light toward the LCD panel 100. The reflecting plate 442 is disposed on substantially the entire surface of the LED circuit board 441. Portions of the reflecting plate 442 corresponding to where the LEDs 440 are arranged are removed.

A diffusion sheet 443 comprises a base plate and a coating layer having beads formed on the base plate. If the light generated from the LEDs 440 is directly supplied to the LCD panel 100, a user recognizes an arrangement type of the LEDs 440. Accordingly, the LCD 1 doesn't have uniform brightness. To avoid this result, the diffusion sheet 443 is provided and evenly diffuses the light generated from the LEDs 440, and then provides the diffused light to the LCD panel 100 via a prism film 444 and a protection film 445.

A plurality of triangular prisms are placed on the prism film 444 in a predetermined alignment. The prism film 444 concentrates the light diffused from the diffusion plate 443 in a direction perpendicular to a surface of the LCD panel 100. Preferably, two prism films 444 are used, and the micro prisms formed on the prism films 444 form a predetermined angle with each other. The light passing through the prism films 444 mainly progresses upward, thereby forming a uniform brightness distribution.

The protection film 445, positioned at the top of a light regulating part, protects the prism film 444 which can be vulnerable to scratching.

A plurality of transparent pillars 451 are formed between the LEDs 440 and the diffusion plate 443 as a light guide part. The number of the transparent pillars 451 in this example is fifteen, which corresponds to the number of LEDs 440, but embodiments of the present invention are not limited thereto. Each transparent pillar 451 has a square pillar shape which encloses the corresponding LED 440 and gets wider toward an upper part, e.g., toward the LCD panel 100. The upper sides of the adjacent transparent pillars 451 are disposed closely to each other. Each transparent pillar 451 may be made of acrylic resin or polycarbonate (PC) materials. Further, each transparent pillar 451 may be a plate shape of which the width is larger than the height unlike the exemplary embodiment shown.

A chassis 500 is provided and comprises an upper chassis 501 and a lower chassis 502, and accommodates the LCD panel 100 and the LEDs 440.

An exemplary operation of the LCD 1 will now be explained in greater detail.

The signal controller 310 is provided with red, green and blue (RGB) image data R, G, and B, and an input control signal for controlling a display of the image data from the graphic controller 320. For example, the input control signal can comprise a vertical synchronizing signal Vsync, a horizontal synchronizing signal Hsync, a main clock CLK, a data enable signal DE, and the like. The signal controller 310 generates a gate control signal, a data control signal and a voltage selection control signal VSC based on the input control signal, and converts the RGB image data R, G, and B to correspond to an operational condition of the LCD panel 100. Thereafter, the gate control signal is transferred to the gate driver 210 and the driving voltage generator 330, and the data control signal and the processed RGB image data R', G', and B' are transferred to the data driver 220. Also, the voltage selection control signal VSC is transferred to the gray scale voltage generator 340.

The gate control signal comprises a vertical synchronization start signal STV for ordering a start time of the output of a gate on pulse (a high region of the gate signal), a gate clock signal CPV for controlling the output time of the gate on pulse, a gate on enable signal OE for limiting the width of the gate on pulse, and the like. The gate on enable signal OE and the gate clock signal CPV among those are provided to the driving voltage generator 330. The data control signal comprises a horizontal synchronization start signal STH for ordering the input of a gray scale signal, a load signal LOAD or TP for ordering the applying of the corresponding data voltage to the data line 121, a control reversion signal RVS for reversing a polarity of the data voltage, a data clock signal HCLK, and the like.

First, the gray scale voltage generator 340 provides a gray scale voltage having a voltage value determined by the voltage selection control signal VSC to the data driver 220.

The gate driver 210 applies the gate on voltage Von to the gate line 111 in order according to the gate control signal from the signal controller 310. The TFT connected to the gate line 111 is then turned on. At substantially the same time, the data driver 220 provides an analog data voltage as the data signal from the gray scale voltage generator 340 corresponding to an image data R', G' and B' about a pixel comprising the turned-on switching device to the corresponding data line 121 according to the data control signal from the signal controller 310.

The data signal provided via the data line 121 is applied to the corresponding pixel through the turned-on TFT. In this manner, the gate on voltage Von is applied to all the gate lines 111 during one frame in turn and thus, the data signal is applied to all of the pixels. After the one frame, the control reversion signal RVS is provided to the driving voltage generator 330 and the data driver 220 and thus, the polarities of all of the data signals in next frame are changed.

In a first embodiment of the present invention, control of the brightness is executed according to the LEDs 440 and thus, brightness interference is decreased between the adjacent LEDs 440 by the transparent pillars 451. An exemplary embodiment will now be described in greater detail by referring to FIG. 4.

Figure 4:
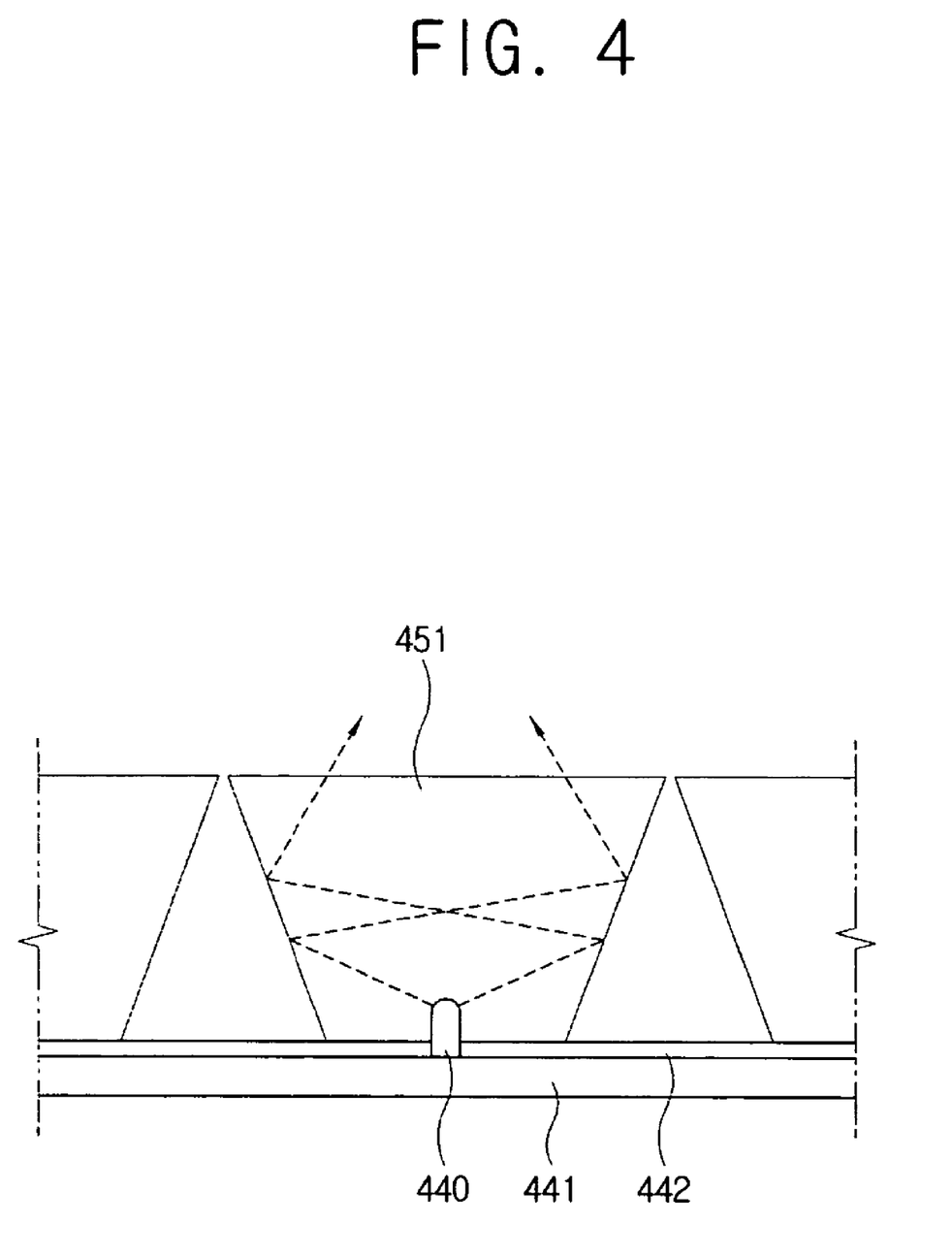
FIG. 4 is a drawing for illustrating a light path in the LCD according to the first embodiment of the present invention.

FIG. 4 is a drawing for illustrating a light path in the LCD according to the first embodiment of the present invention. The light from the LED 440 enters the transparent pillar 451 which encloses the LED 440. A portion of the light from the LED 440 is radiated toward the upper part, e.g., the LCD panel 100, and another portion of the light from the LED 440 is reflected by a side wall of the transparent pillar 451 and is then directed to the LCD panel 100.

The light radiated from the side wall of the transparent pillar 451 is restricted due to a difference of a refractive index between the transparent pillar 451 and the surrounding air. As the transparent pillar 451 goes toward the upper part, the sectional area of the transparent pillar 451 is increasingly larger. Accordingly, an incident angle that the light from the LED 440 enters into the side wall of the transparent pillar 451 is larger and thus, a substantially total reflection occurs. Accordingly, the control of the brightness becomes easier since the amount of the light from the side wall of the transparent pillar 451 which affects other adjacent transparent pillars 451 is decreased.

Additionally, the LEDs 440 of embodiments of the present invention can be divided into a plurality of partitioned areas. Also, the LCD panel can be divided into a plurality of regions and thus, the brightness thereof can be calculated. Therefore, the power provided to each LED 440 can be controlled on a basis of the calculated brightness. An exemplary embodiment will now be described in greater detail by referring to FIGS. 5 and 6.

Figure 5:
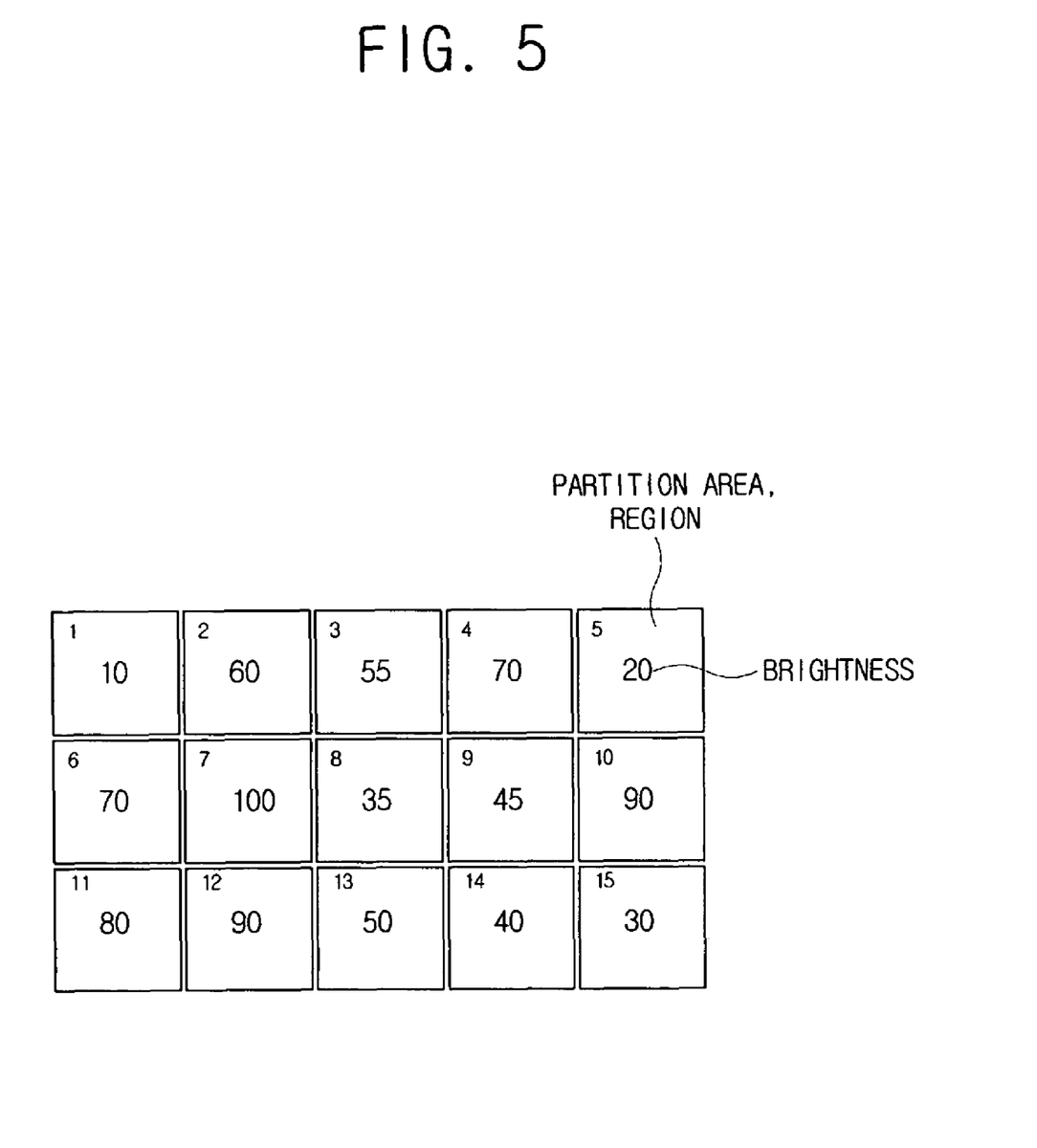
FIG. 5 is a drawing for illustrating the brightness according to the partitioned areas in the LCD according to the first embodiment of the present invention.
Figure 6:
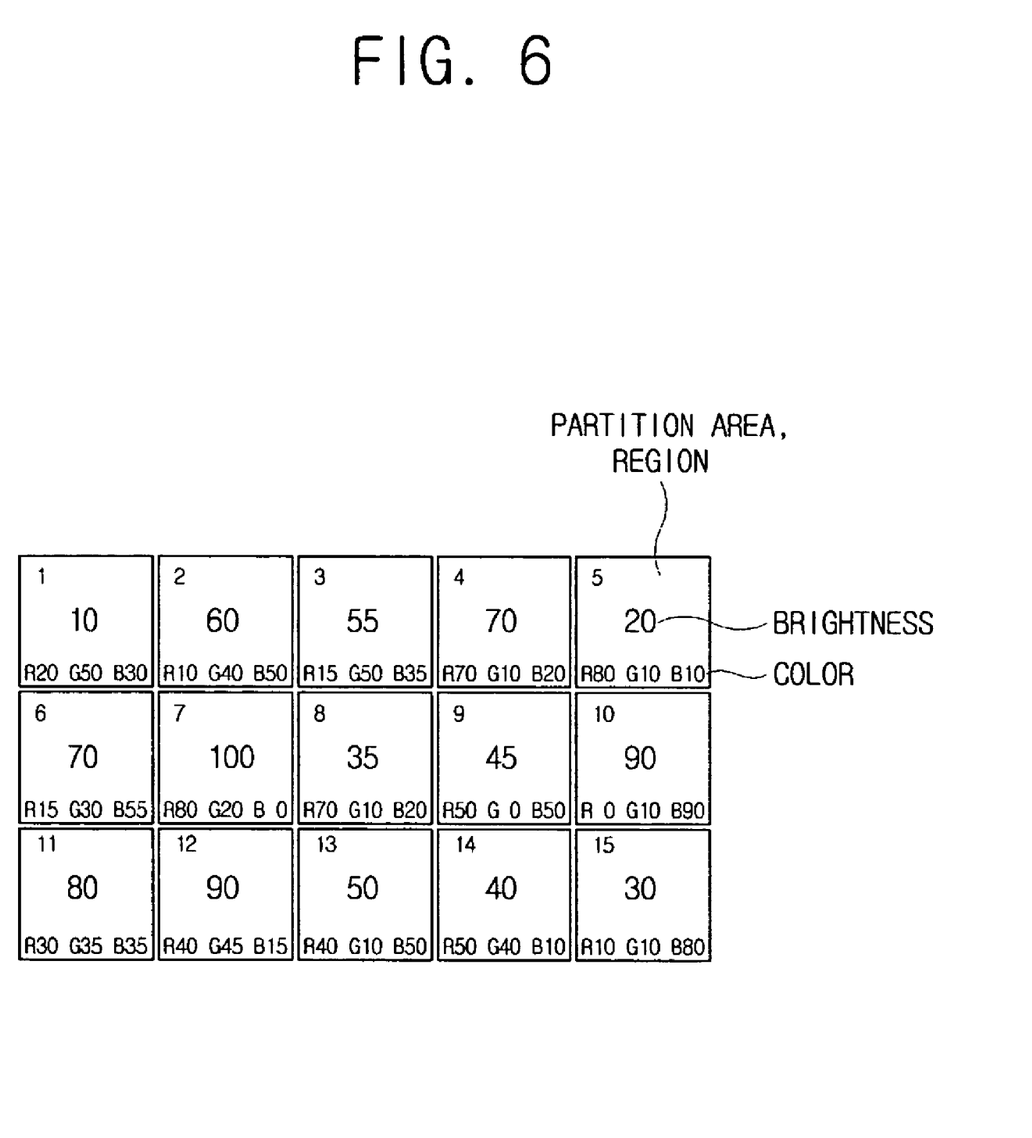
FIG. 6 is a drawing for illustrating the brightness and color according to the partitioned areas in the LCD according to the first embodiment of the present invention.

FIG. 5 is a drawing for illustrating the brightness according to the partitioned area in the LCD according to the first embodiment of the present invention. FIG. 6 is a drawing for illustrating both the brightness and color according to the partitioned area in the LCD according to the first embodiment of the present invention.

In the first embodiment of the present invention, the LCD panel 100, e.g., a region of the screen, is the same as the partition area of the LEDs 440. One of the LEDs 440 and one of the transparent pillars 451 are disposed in each partitioned area.

The RGB image data R, G, and B from the graphic controller 320 is input to the image calculating part 410. The image calculating part 410 divides the LCD panel 100, e.g., the screen into the plurality of regions and calculates the brightness in each region. The plurality of regions are provided respectively as having the same size. The number of regions can be increased such that the contrast ratio is improved. However, the control of the regions becomes more complicated. The regions can have a lattice shape that is divided into a transverse direction and a longitudinal direction of the screen.

Preferably, the brightness of each region is calculated as the mean brightness of each region. However, the image calculating part 410 can remember the image of the previous frame such that the image calculating part 410 can provide a difference value of the brightness between the frames to the inverter controller 420. Preferably, the vertical synchronizing signal Vsync, the horizontal synchronizing signal Hsync, and the main clock CLK, as well as image data from the graphic controller 320, are further provided to the image calculating part 410.

The inverter controller 420 controls the inverter 430 on a basis of the calculated brightness from the image calculating part 410 for each the region. That is, the LED 440 corresponding to the region having a high brightness provides the light of the high brightness, and the LED 440 corresponding to the region having a low brightness provides the light of the low brightness. In this manner, the inverter controller 420 controls the inverter 430. To achieve this, the inverter 430 supplies power which can be different for the respective regions to the LED 440 corresponding to the brightness of each region. Accordingly, the brightness of the LEDs 440 provided to the screen is changed according to each of the regions as shown by the brightness values (e.g., 10, 60, 55) in FIG. 5. In the next frame, the brightness of the LED 440 is also changed according to the image data.

The image calculating part 410 and the inverter controller 420 can be provided separately, or included in the signal controller 310.

According to the first embodiment of the present invention, the brightness of the LEDs 440 may be adjusted by the regions of the screen. Accordingly, a bright region may be brighter and a dark region may be darker. In doing so, for example, an explosion scene or a scene expressing an instant flash may be displayed more effectively.

Accordingly, the contrast ratio of the screen can be improved and the power used in driving the LEDs 440 can be distributed effectively. Further, the brightness in one of the partitioned areas of the LED 440 does not substantially influence the brightness of the adjacent partitioned areas by the use of the transparent pillars 451.

As described above, the driving of the LEDs 440 is controlled in consideration of the brightness of each region. However, the driving of the LEDs 440 can also be controlled in consideration of the color of each region.

FIG. 6 illustrates the brightness and relative intensity between a red R, green G, and blue B color based on the light which the LED 440 provides to each region. In this embodiment of the present invention, the image calculating part 410 calculates the color as well as the brightness of each region. The inverter controller 420 controls the inverter 430 to supply power to the LED 440 based on the color and the brightness. For example, if the color red R is significantly displayed on a fourth region based on a calculating result of the image calculating part 410, the LED 440 corresponding to the fourth region provides red R to a greater extent. In doing so, much more power is provided to the LED 440 emitting the red R than emitting the blue B or green G colors. Since red color expressed from a red light is more vivid than that from white light, display quality can be enhanced.

The first embodiment of the present invention may have various modifications and variations. For example, a plurality of the partitioned areas can be disposed in one region. Further, a plurality of the light guide parts can be formed in each partitioned area. Also, each light guide part can be used to guide the light from a plurality of LEDs 440.

Figure 7:
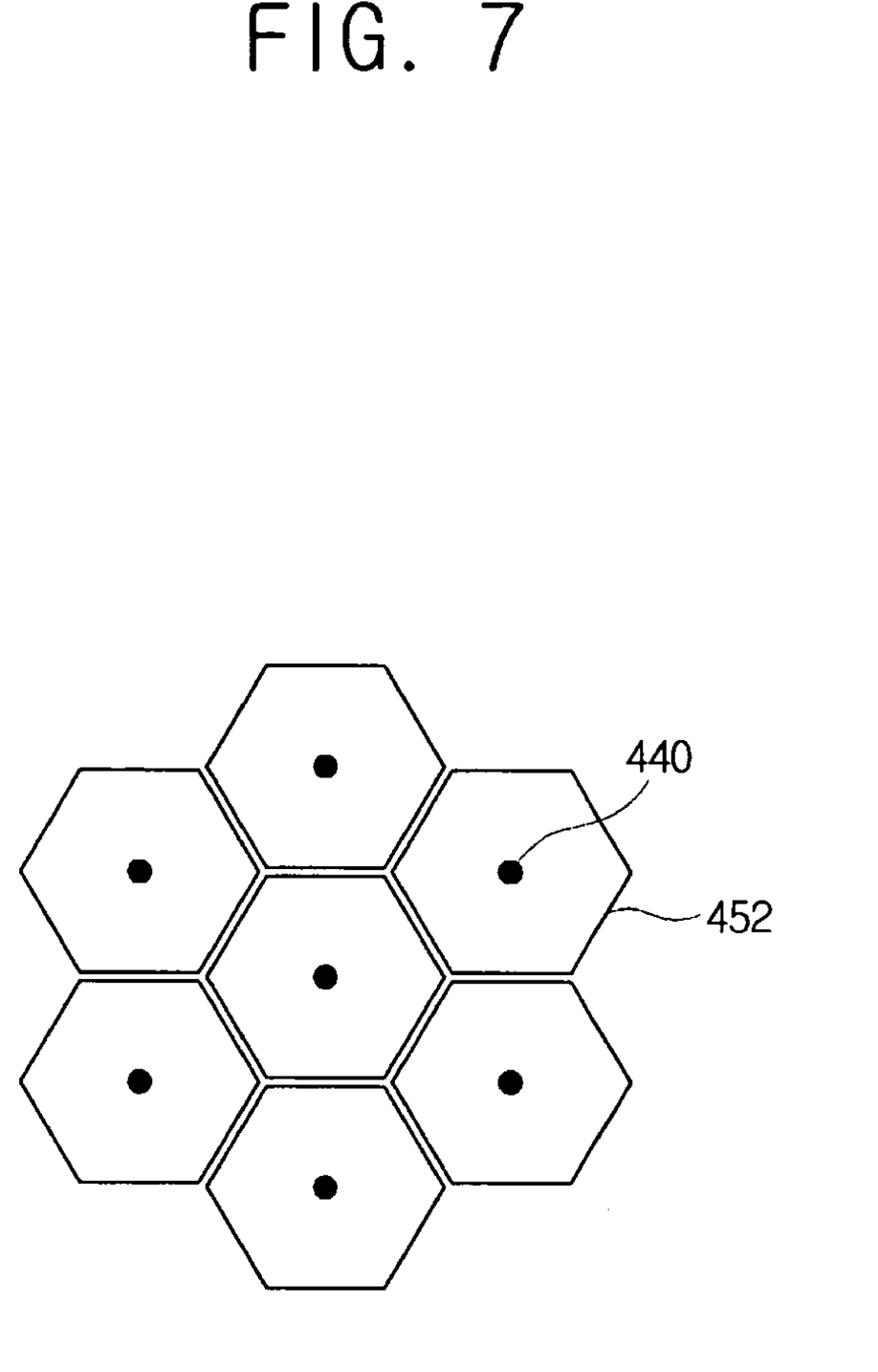
FIG. 7 is a drawing for illustrating an exemplary arrangement between an LED and a light guide part according to a second embodiment of the present invention.

FIG. 7 is a drawing for illustrating an exemplary arrangement between an LED and a light guide part according to a second embodiment of the present invention.

The light guide part according to the second embodiment of the present invention comprises a transparent pillar 452 substantially the same as the pillars 451 of the first embodiment. However, a section of the transparent pillar 452 is a hexagon shape. The light emitted from the LED 440 exits the LED 440 in a circular shape. Accordingly, the transparent pillar 452 is a hexagonal pillar which is more similar to the circular shape and is filled with more planes and thus, the light efficiency can be increased.

Figure 8:
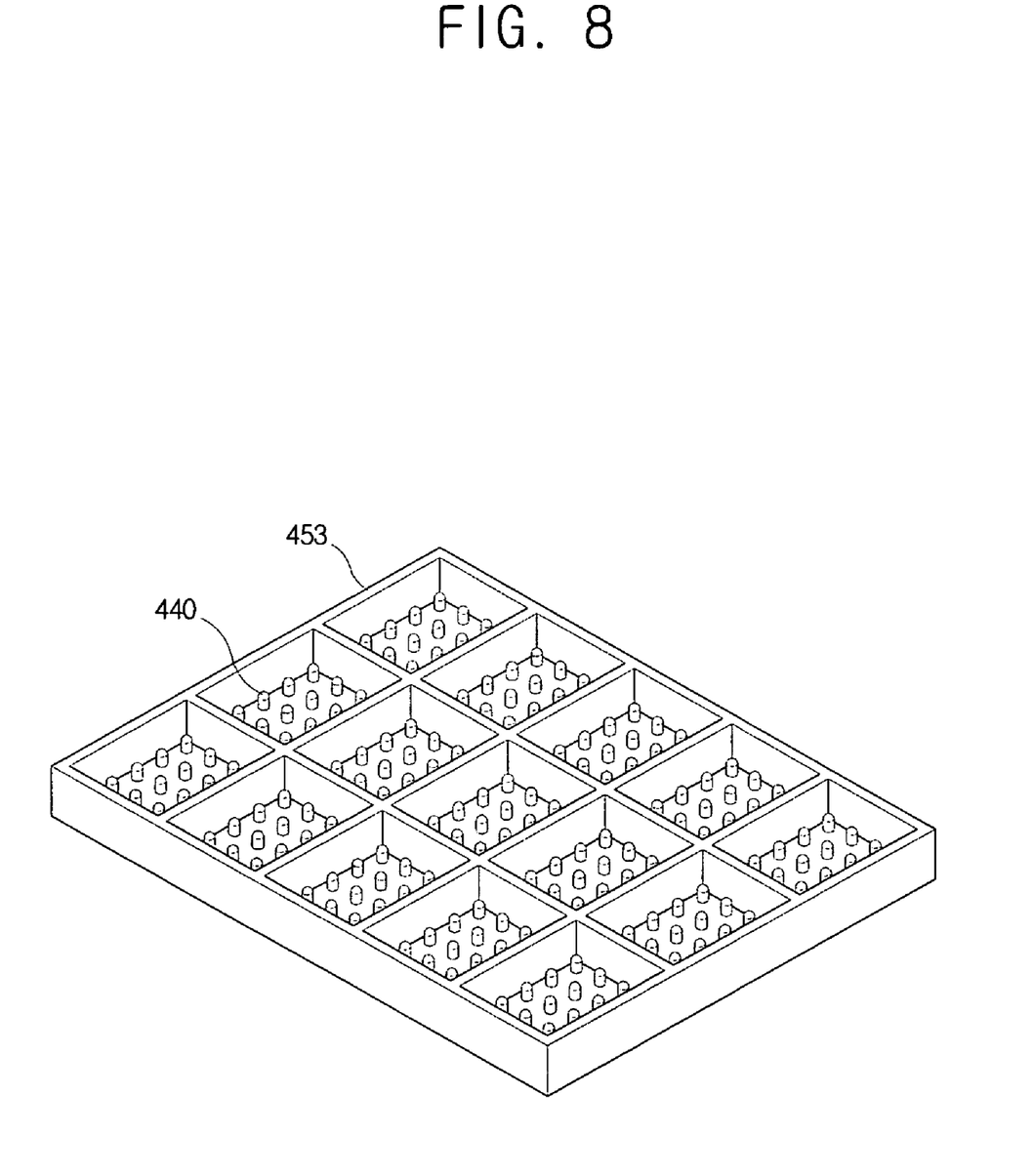
FIG. 8 is a perspective view for illustrating an exemplary arrangement between an LED and a light guide part according to a third embodiment of the present invention.
Figure 9:
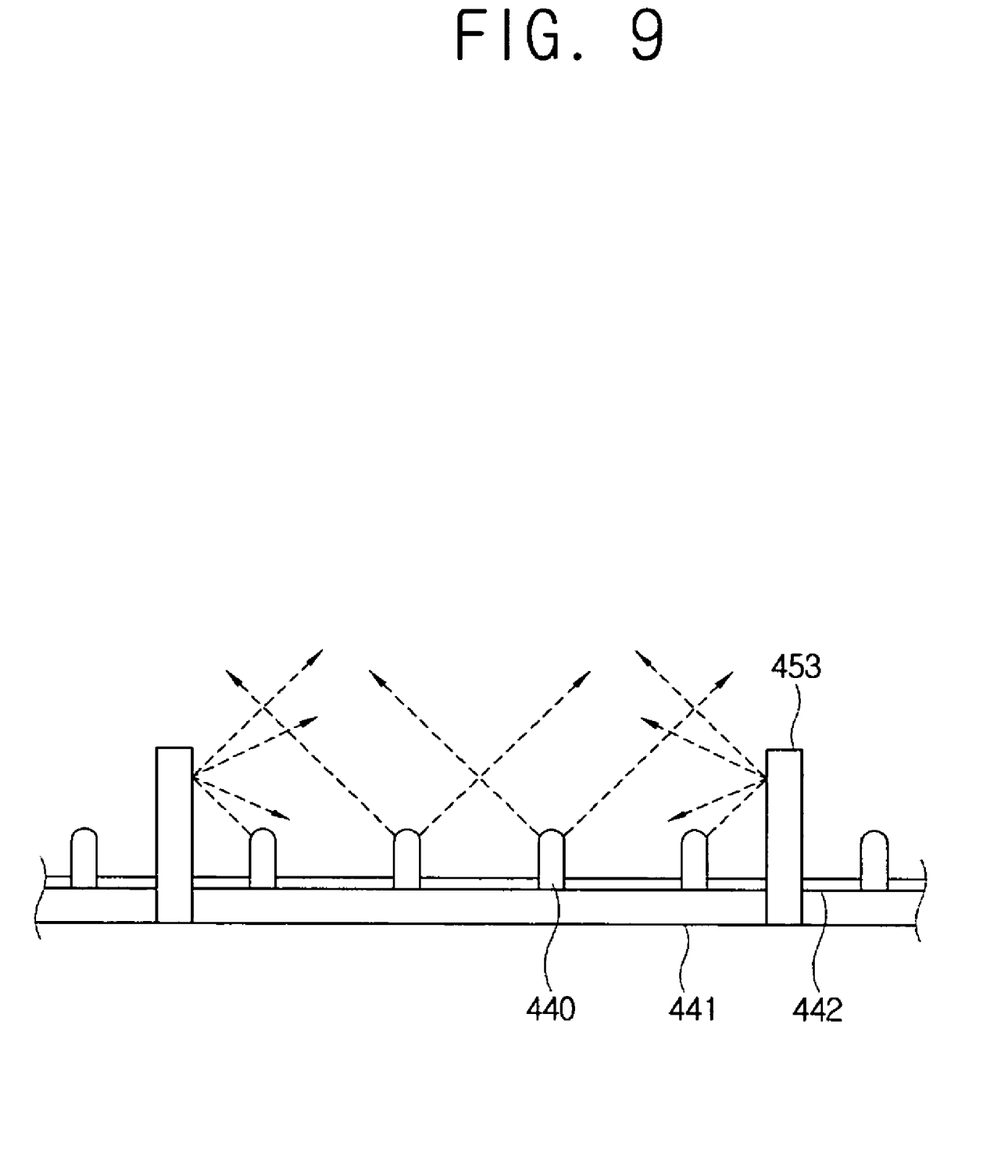
FIG. 9 is a drawing for illustrating a light path in the LCD according to the third embodiment of the present invention.

FIG. 8 is a perspective view for illustrating an exemplary arrangement between an LED and a light guide part according to a third embodiment of the present invention. FIG. 9 is a drawing for illustrating a light path in the LCD according to the third embodiment of the present invention.

In the third embodiment of the present invention, a partition 453 is provided as the light guide part. The partition 453 is higher than the LEDs 440. A part surrounded by the partition 453 is referred to as a partitioned area. A plurality of the LEDs 440 are provided in each partitioned area. The LEDs 440 having different colors are disposed in each partitioned area so that white light is provided in it by mixing colors.

As shown in FIG. 9, the light generated from the LEDs 440 is directed to the LCD panel 100 or is reflected by the partition 453 and is then directed to the LCD panel 100. Accordingly, the light from the LEDs 440 has less influence on the brightness of another adjacent partitioned area by the partition 453. In addition, an efficiency of the color mixing can be increased due to a light reflection of the partition 453. The partition 453 can be formed with a white color film having good reflectivity and can comprise polyethylene terephthalate (PET), polycarbonate (PC), and the like.

Figure 10:
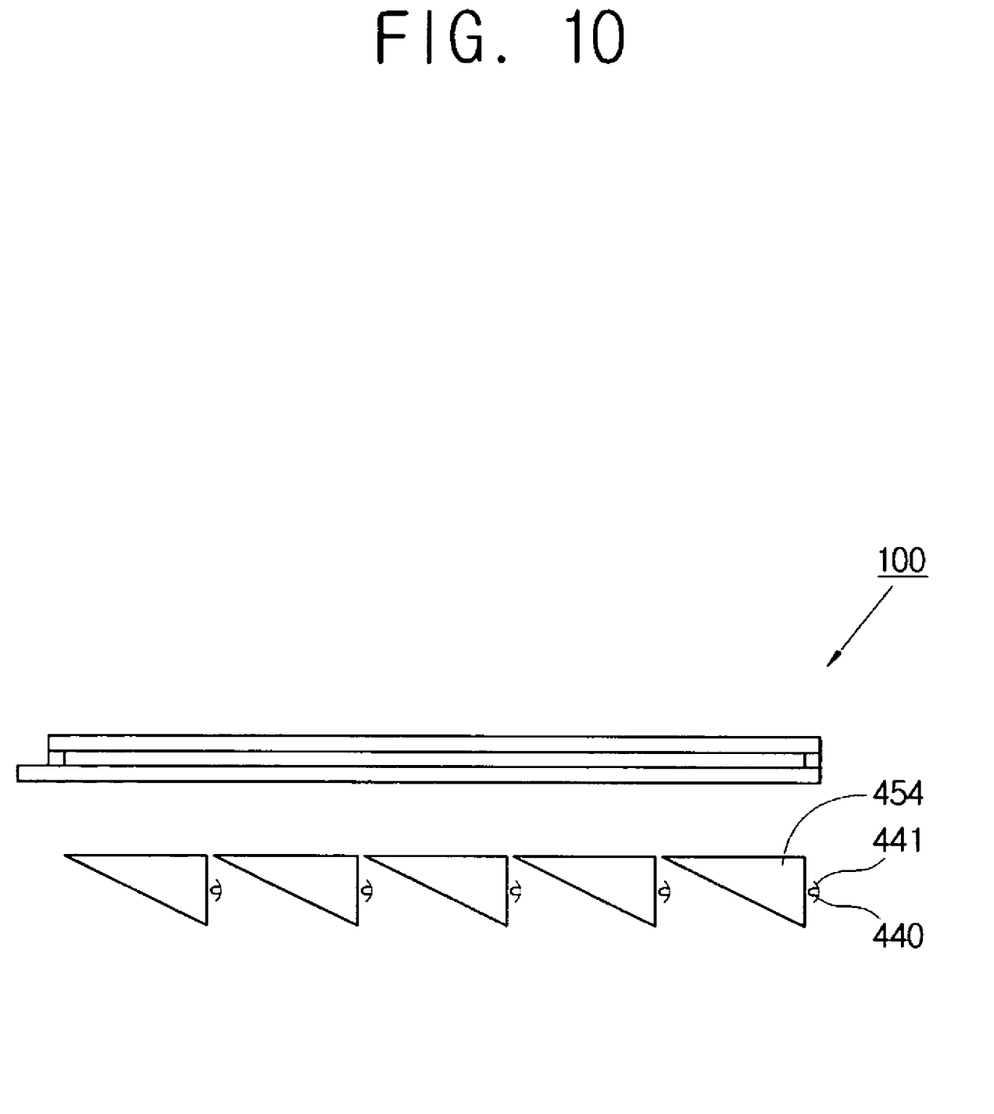
FIG. 10 is a sectional view of an exemplary LCD according to a fourth embodiment of the present invention.
Figure 11:
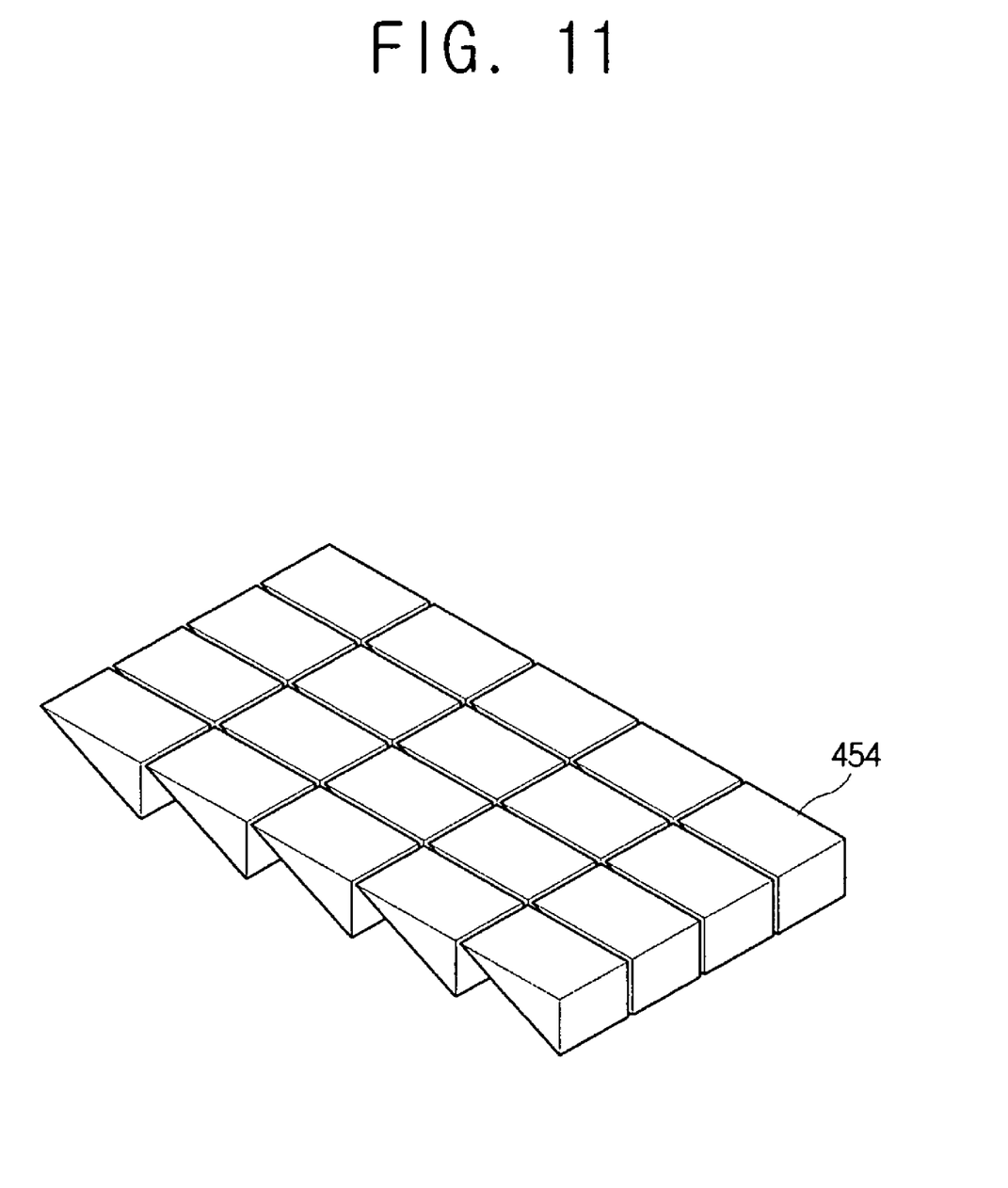
FIG. 11 is a perspective view of a light guide part in the LCD according to the fourth embodiment of the present invention.

FIG. 10 is a sectional view of an exemplary LCD according to a fourth embodiment of the present invention. FIG. 11 is a perspective view of a light guide part in the LCD according to the fourth embodiment of the present invention.

As shown in FIG. 10, a plurality of sub light guide plates 454 are provided as the light guide part. Each the sub light guide plates 454 have a wedge shape and are arranged on the same plane. A light exiting plane of each sub light guide plate 454, e.g., a plane facing the LCD panel 100, is substantially parallel to the LCD panel 100. A light incident plane of each sub light guide plate 454 is provided with the LED 440 and the LED circuit board 441.

The brightness of the LED 440 disposed in each sub light guide plate 454 is differentiated so that light having different brightness can be provided to each region. The light generated from each of the LEDs 440 is mainly provided in the corresponding sub light guide plate 454 and thus, does not influence the adjacent sub light guide plates 454. Although not shown in FIG. 10, it is preferable that a reflecting plate is provided on a reflecting plane, e.g., a lower part of the sub light guide plate 454.

Figure 12:
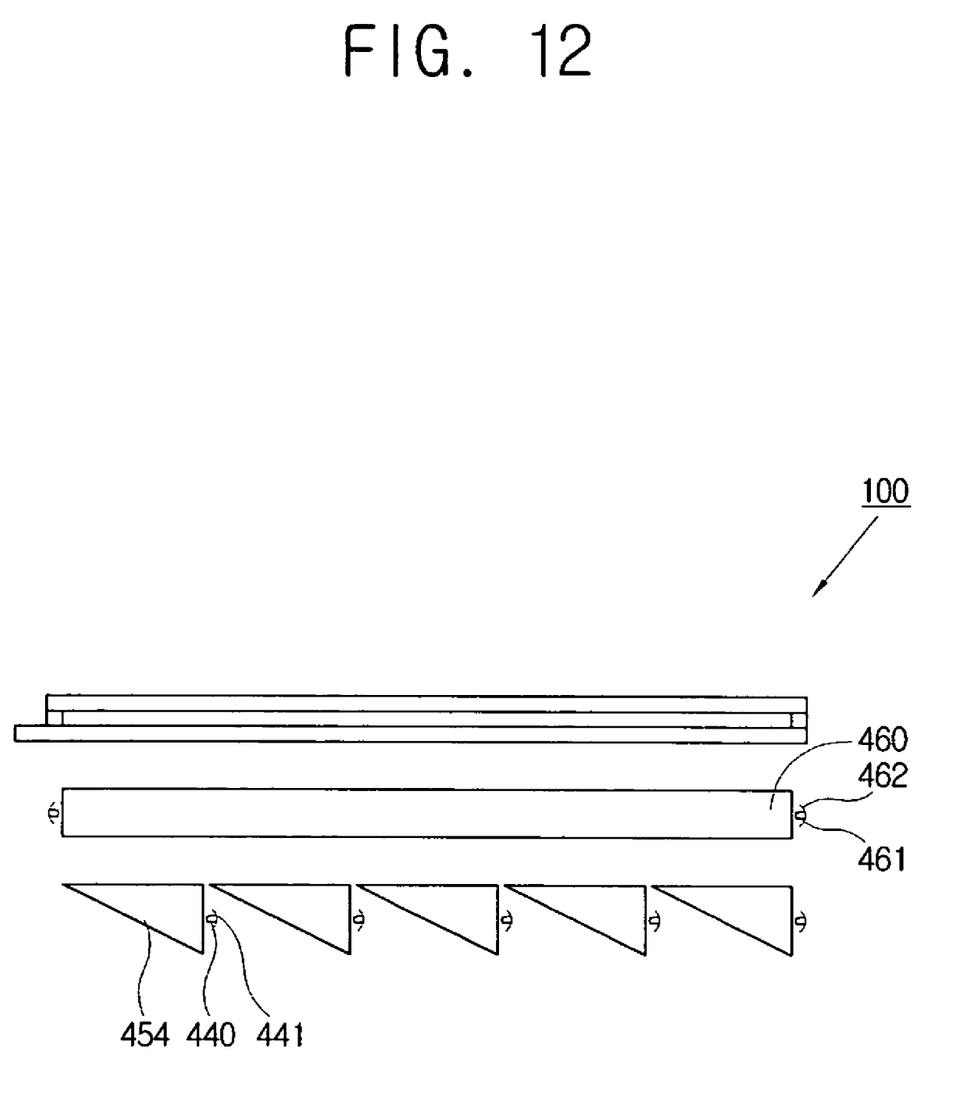
FIG. 12 is a sectional view of an exemplary LCD according to a fifth embodiment of the present invention.

FIG. 12 is a sectional view of an exemplary LCD according to a fifth embodiment of the present invention. In the fifth embodiment of the present invention, the sub light guide plate 454 is provided as the light guide part substantially the same as described in the fourth embodiment.

However, a main light guide plate 460 is disposed between the sub light guide plates 454 and the LCD panel 100. Also, a main LED 461 and a main LED circuit board 462 are provided and are disposed at a lateral side of the main light guide plate 460.

It will be apparent to those skilled in the art that various modifications and variations can be made in the present invention without departing from the spirit or scope of the invention. Thus it is intended that the present invention cover the modifications and variations of this invention provided they come within the scope of the appended claims and their equivalents.

What is claimed is:

1. A liquid crystal display, comprising:
    a liquid crystal display panel;
    a light emitting diode device comprising a plurality of partitioned areas, each of the partitioned areas being driven independently of adjacent partitioned areas;
    a plurality of light guide parts, the light guide parts for guiding light generated from corresponding ones of the partitioned areas of the light emitting diode device toward the liquid crystal display panel;
    an image calculating part for dividing the liquid crystal display panel into a plurality of regions and calculating brightness of each of the regions by using image data, the regions being arranged along a transverse direction and a longitudinal direction of the liquid crystal display panel;
    an inverter for providing power to each of the partitioned areas of the light emitting diode device; and
    an inverter controller for controlling the inverter to provide power to each of the partitioned areas of the light emitting diode device according to the calculated brightness of corresponding regions of the liquid crystal display panel;
    wherein the provided power to each of the partitioned areas of the light emitting diode device by the inverter has a different level from each other according to the calculated brightness of each of the regions; and
    wherein the light emitting diode corresponding to the region having a high brightness provides a light of the high brightness, and the light emitting diode corresponding to the region having a low brightness provides a light of the low brightness.

2. The liquid crystal display according to claim 1, wherein the light emitting diode device is disposed on substantially the entire rear surface of the liquid crystal display panel.

3. The liquid crystal display according to claim 2, wherein the light guide part comprises a transparent pillar disposed between the light emitting diode device and the liquid crystal display panel.

4. The liquid crystal display according to claim 3, wherein the transparent pillar substantially encloses the light emitting diode device.

5. The liquid crystal display according to claim 3, wherein a section of the transparent pillar facing the liquid crystal display panel is a rectangular shape.

6. The liquid crystal display according to claim 3, wherein a section of the transparent pillar facing the liquid crystal display panel is a hexagonal shape.

7. The liquid crystal display according to claim 3, wherein a section of the transparent pillar becomes wider toward the liquid crystal display panel.

8. The liquid crystal display according to claim 1, wherein the light guide part comprises a partition that is positioned above the light emitting diode device.

9. The liquid crystal display according to claim 1, wherein the light guide part comprises a partition, wherein the partition comprises a white color film.

10. The liquid crystal display according to claim 1, wherein the light guide part comprises a partition, wherein the partition comprises a polyethylene terephthalate (PET) or polycarbonate (PC) material.

11. The liquid crystal display according to claim 1, wherein the light guide part comprises a plurality of sub light guide plates, and the light emitting diode device is provided on a light incident plane of each sub light guide plate.

12. The liquid crystal display according to claim 11, wherein the sub light guide plates are disposed on the same plane.

13. The liquid crystal display according to claim 11, wherein the sub light guide plates have a wedge shape.

14. The liquid crystal display according to claim 13, wherein the light emitting diode device is disposed at a side of the sub light guide plates.

15. The liquid crystal display according to claim 11, wherein a light exiting plane of the sub light guide plate is substantially parallel to the liquid crystal display panel.

16. The liquid crystal display according to claim 11, further comprising:
    a main light guide plate disposed between the plurality of sub light guide plates and the liquid crystal display panel; and
    a light source provided on a light incident plane of the main light guide plate.

17. The liquid crystal display according to claim 1, wherein:
    the image calculating part is configured to calculate a color value of each region; and
    the inverter controller is configured to control the inverter to provide respective power to the light emitting diode device based on the calculated color value.

18. The liquid crystal display according to claim 1, wherein the partitioned areas for the light emitting diode device and the regions correspond to each other.

19. A method of controlling a liquid crystal display, comprising:
    dividing a light emitting diode device into a plurality of partitioned areas, wherein each of the partitioned areas is driven independently of adjacent partitioned areas;
    providing a liquid crystal display panel;
    providing a plurality of light guide parts, the light guide parts for guiding light generated from corresponding light emitting diodes of the light emitting diode device toward the liquid crystal display panel;

dividing the liquid crystal display panel into a plurality of regions and calculating brightness of each of the regions by using image data, the regions being arranged along a transverse direction and a longitudinal direction of the liquid crystal display panel; and providing power to each of the partitioned areas of the light emitting diode device based on the calculated brightness of corresponding regions of the liquid crystal display panel;

wherein the provided power to each of the partitioned areas of the light emitting diode device by an inverter has a different level from each other according to the calculated brightness of each of the regions;

wherein the light emitting diode corresponding to the region having a high brightness provides a light of the high brightness, and the light emitting diode corresponding to the region having a low brightness provides a light of the low brightness.

20. The method according to claim 19, further comprising:
calculating a color value of each region; and
providing respective power to the light emitting diode device based on the calculated color value.

21. A liquid crystal display, comprising:
a liquid crystal display panel;
a light emitting diode device comprising a plurality of partitioned areas, each of the partitioned areas being driven independently of adjacent partitioned areas;
a plurality of light guide parts, the light guide parts for guiding light generated from corresponding ones of the partitioned areas of the light emitting diode device toward the liquid crystal display panel;
an image calculating part for dividing the liquid crystal display panel into a plurality of regions and calculating brightness of each of the regions by using image data, the regions being arranged along a transverse direction and a longitudinal direction of the liquid crystal display panel;
an inverter for providing power to each of the partitioned areas of the light emitting diode device; and
an inverter controller for controlling the inverter to provide power to each of the partitioned areas of the light emitting diode device according to the calculated brightness of corresponding regions of the liquid crystal display panel;
wherein each of the light guide parts comprises a transparent pillar disposed between the light emitting diode device and the liquid crystal display panel;
wherein the provided power to each of the partitioned areas of the light emitting diode device by the inverter has a different level from each other according to the calculated brightness of each of the regions; and
wherein the light emitting diode corresponding to the region having a high brightness provides a light of the high brightness, and the light emitting diode corresponding to the region having a low brightness provides a light of the low brightness.

22. The liquid crystal display according to claim 21, wherein each of the light guide parts comprises a plurality of sub light guide plates, and the light emitting diode device is provided on a light incident plane of each sub light guide plate.

23. The liquid crystal display according to claim 22, wherein the sub light guide plates are disposed on the same plane.

24. The liquid crystal display according to claim 22, wherein the sub light guide plates comprise a wedge shape.

25. The liquid crystal display according to claim 24, wherein the light emitting diode device is disposed at a side of the sub light guide plates.

26. The liquid crystal display according to claim 22, wherein a light exiting plane of the sub light guide plate is substantially parallel to the liquid crystal display panel.

27. The liquid crystal display according to claim 22, further comprising:
a main light guide plate disposed between the plurality of sub light guide plates and the liquid crystal display panel; and
a light source provided on a light incident plane of the main light guide plate.

28. A liquid crystal display, comprising:
a liquid crystal display panel;
a light emitting diode device comprising a plurality of partitioned areas, each of the partitioned areas being driven independently of adjacent partitioned areas;
a plurality of light guide parts, the light guide parts for guiding light generated from corresponding ones of the partitioned areas of the light emitting diode device toward the liquid crystal display panel;
an image calculating part for dividing the liquid crystal display panel into a plurality of regions and calculating brightness of each of the regions by using image data, the regions being arranged along a transverse direction and a longitudinal direction of the liquid crystal display panel;
an inverter for providing power to each of the partitioned areas of the light emitting diode device; and
an inverter controller for controlling the inverter to provide power to each of the partitioned areas of the light emitting diode device according to the calculated brightness and the relative intensity among the plurality of colors of corresponding regions of the liquid crystal display panel;
wherein the provided power to each of the partitioned areas of the light emitting diode device by the inverter has a different level from each other according to the calculated brightness and the relative intensity among the plurality of colors of each of the regions.

* * * * *